Sept. 6, 1949.　　　　O. E. BOWLUS　　　　2,481,071
HIGH-FREQUENCY INDUCTION HEATING DEVICE
Filed July 25, 1945
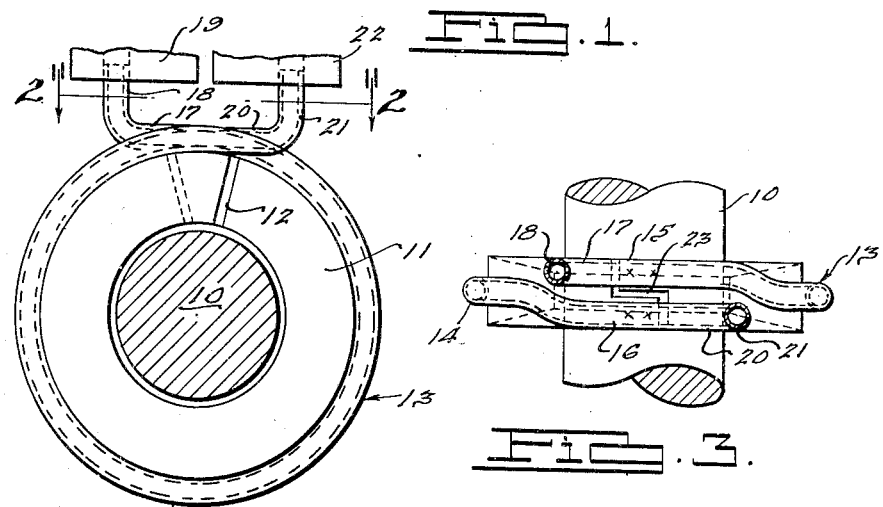
Fig. 1.
Fig. 3.
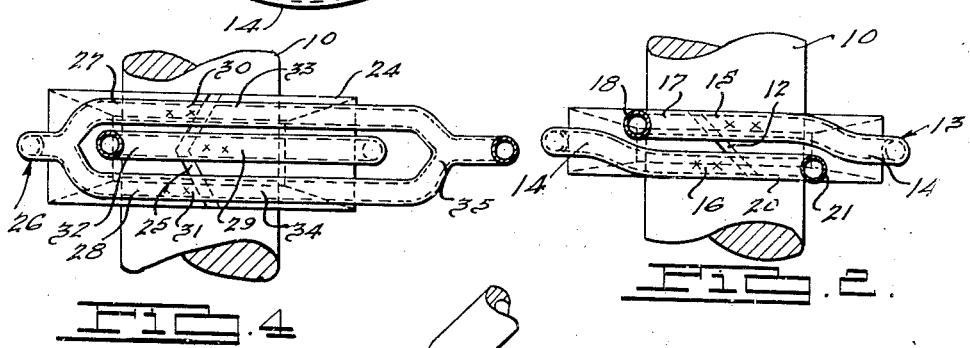
Fig. 4.
Fig. 2.
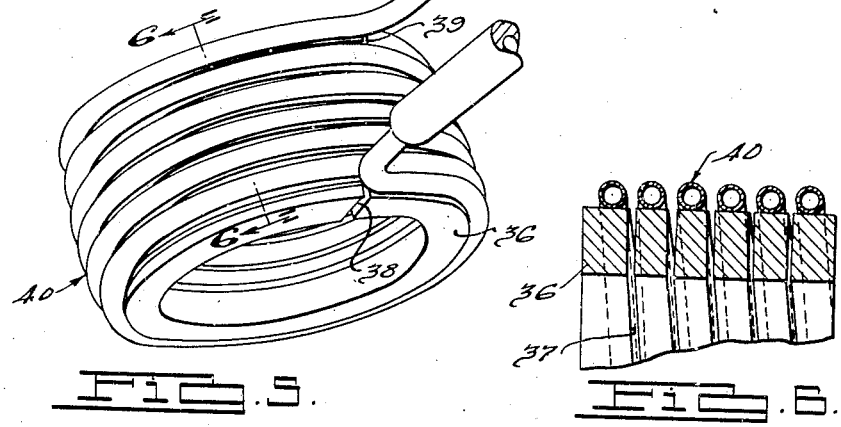
Fig. 5.
Fig. 6.
INVENTOR.
Omer E. Bowlus.
BY
Harness and Harris
ATTORNEYS.

Patented Sept. 6, 1949

2,481,071

UNITED STATES PATENT OFFICE 2,481,071

HIGH-FREQUENCY INDUCTION HEATING DEVICE

Omer E. Bowlus, Detroit, Mich., assignor to Chrysler Corporation, Highland Park, Mich., a corporation of Delaware Application July 25, 1945, Serial No. 606,905

8 Claims. (Cl. 219—13)

This invention relates to a heating device and more particularly a device that heats by means of high frequency electric current.

It is known to heat only at the surface or over only a small portion of an object by the localized effect of high frequency current acting on the object through induction. For example, it is known to heat a certain width of a peripheral surface of an object by means of a split ring to which a high-frequency current is applied at opposite sides of the split. The heating is of uniform effect except at the split, where, for example, if the heating is to effect a surface hardening, a soft region is left directly beneath the split, or else the depth of hardening is less at this region. I have made improvements in devices of this sort for eliminating or minimizing the effects of such regions.

An object of the present invention is to make improvements in electrical heating devices operating through the inductive effects of high-frequency current.

A further object is to provide an improved heating device of the type adapted to provide localized heating over a peripheral surface of an object. By the improved device regions of the heated surface where the heating has been less pronounced are eliminated or reduced, or the effects of such underheating are minimized.

Another object is to provide improvements in a high-frequency heater of the type composed of a split ring and a hollow coolant-carrying element bonded to the ring for supplying current thereto. Such improvements may involve change in the shape of the split in the ring or of the arrangement of the coolant-carrying element.

Other objects will appear from the disclosure.

In the drawing:

Fig. 1 is a view of one form of the improved heating device of the present invention and a shaft being treated thereby;

Fig. 2 is a sectional view taken on the line 2—2 of Fig. 1;

Fig. 3 is a view similar to Fig. 2 showing a second form of improved heating device;

Fig. 4 is a view similar to Fig. 2 showing a third form of improved heating device;

Fig. 5 is a perspective view of a fourth form of the improved heating device; and Fig. 6 is a sectional view taken on the line 6—6 of Fig. 5.

As seen in Figs. 1 and 2, the reference character 10 designates a shaft, which is surrounded by a ring 11 having a diagonal split 12. A hollow tubular element 13 surrounds the ring 11. The ring and tubular element are formed of the same or different current conducting materials, which may, for example, be copper, since its conductivity is relatively high, and its cost is cheap in comparison with silver, which is otherwise suitable because of its high conductivity. An intermediate portion 14 of the tubular element 13 actually embraces the ring 11 and has end regions 15 and 16, which are bonded, for example, by silver solder to the ring at opposite sides of the split 12. As seen in Fig. 2, the end region 15 is joined to the portion of the ring 11 immediately to the right of the split 12 by silver solder as indicated by "x" marks. Similarly the end region 16 of the tubular element is joined to the portion of the ring immediately to the left of the split by silver solder as indicated by "x" marks. The remainder of the intermediate portion 14 is bonded to the outer periphery of the ring 11, for example, by lead solder. By virtue of the diagonal split 12 the end regions 15 and 16 of the intermediate portion 14 of the tubular element 13 overlap to some extent. Extending to the left from the end region 15 is a terminal portion 17 of the tubular element 13, which terminal portion crosses the split 12 and extends along the ring 11 in overlapping relation with the end region 16 out of contact with the ring and the end region 16 for a short distance and then away from the ring as indicated at 18 to a block 19. Extending to the right from the end region 16 is a terminal portion 20 of the tubular element 13, which terminal portion crosses the split 12 and extends along the ring 11 in overlapping relation with the end region 15 out of contact with the ring and the end region 15 for a short distance and then away from the ring as indicated at 21 to a block 22.

The blocks 19 and 22 supply high-frequency current to the tubular element 13, which in turn supplies such current to the ring 11. The passage of this current through the ring and particularly on the interior surface where it is concentrated because of the presence of the shaft 10, induces a high-frequency current in the shaft 10 particularly on the surface thereof. The high-frequency current may be of the order of two million cycles per second, and its duration will probably be for only a fraction of a second. Thus a very high heating will occur only at the surface of the shaft over a width corresponding to the inside width of the ring 11. It will be seen from Fig. 2 that the ring is of trapezoidal section, the small base thereof constituting the interior width of the ring, which is definitely smaller than the exterior width, which is the large base of the trapezoid. The effect of the heating may be to produce a surface hardening. A coolant is supplied to the tubular element 13 by one of the blocks so as to keep the ring 11 from overheating. A trapezoid is an ideal shape for keeping the interior width at the minimum required for a narrow band of surface to be hardened and the exterior width at the maximum required for the overlap of the ends of the tubular element 13. Other shapes may, of course, be employed.

It will be appreciated that a split in the ring 11 is required in order that current may be carried around the ring. At the split the intensity of the current induced in the shaft 10 is less than at other regions, and so the heating will be less. If the heating produces a hardening effect, then at the split there will be a soft spot in the shaft or a spot with less thickness of hardening. I have lessened or eliminated the soft spot by arranging the tubular element 13 so that there is an overlapping of sections of the tubular element 13 adjacent the split. As previously stated, the diagonal split makes the end regions 15 and 16 overlap to some extent; the terminal portion 17 overlaps the end region 16; and the terminal portion 20 overlaps the end region 15. The overlapping tends to increase the current intensity and thus compensates for the decrease in current intensity at the split.

Since the split 12 is diagonal, any soft region or region of decreased thickness of hardening formed because of the split will tend to be non-axial. If there must be such a region in a section of a hardened surface of a shaft, it is in many instances better that such region be non-axial rather than axial.

The modified form of heating device of Fig. 3 differs from that of Figs. 1 and 2 in that the split in the ring 11 is stepped as indicated at 23 rather than diagonal. Thus the ends of the tubular element 13 overlap in the manner of Figs. 1 and 2. The end regions 15 and 16 of the intermediate portion 14 overlap; the end portion 20 overlaps the end region 15; and the end portion 17 overlaps the end region 16. This overlapping increases the current intensity and thus compensates for the decrease in current intensity due to the split 23. Any soft region or region of decreased thickness of hardening produced by the stepped split will have a stepped shape, which for many installations will be less disadvantageous than a straight axially extending soft region.

In the modified form of heating device of Fig. 4 a ring 24 has a split 25 of V-shape. A tubular element 26 surrounds the ring 24 and is formed in two branches 27 and 28 for a certain portion of its length. To the right of the V-split 25 or on the male end of the ring 24 a portion 29 of the tubular element 26 is bonded, for example, by silver solder as indicated by "x" marks. To the left of the V-split 25 or on the female end of the ring 24 portions 30 and 31 of the branches 27 and 28 of the tubular element are bonded, for example, by silver solder as indicated by "x" marks. The remainder of the portion of the tubular element 26 embracing the ring 24 may be joined to the ring by lead solder. The ring and the tubular element are advantageously formed of copper. Portions 30 and 31 of the tubular element overlap the portion 29. A portion 32 extends from the portion 29 across the split 25 and over the ring 24 to the left of the split in overlapping relation with the portions 30 and 31 of the branches 27 and 28 out of contact with the female end of the ring and the branches 27 and 28. Portions 33 and 34 of the branches 27 and 28 extend from the portions 30 and 31 thereof across the split 25 over the male end of the ring 24 in overlapping relation to the portion 29 of the tubular element 26 without contacting the portion 29 and the male end of the ring. The branches rejoin at the right in Fig. 4 as indicated at 35.

In view of the above it will be seen that there is overlapping at the region of the V-split 25, and thus an increase in current intensity is produced tending to compensate for the decrease in current intensity due to the V-split 25. Whatever soft region or region of decreased thickness is produced by the V-split will be of V-shape and will not extend axially as would be the case with a straight axial split in the ring. In many instances a V-shaped non-axial soft region will be less disadvantageous than a straight axial soft region.

In the modification of Figs. 5 and 6 a ring 36 of considerable length is provided having a spiral slot 37 terminating in axial portions 38 and 39. Thus there is provided in effect a spiral ring of a plurality of turns. A tubular element 40 is wound about the ring 36 and is suitably bonded thereto. Both ring and tubular element are advantageously formed of copper. The significant thing is that the axial portions 38 and 39 of the spiral slot 37, where the ends of the tubular element 40 extend away from the spiral portion thereof, are circumferentially displaced from one another so that between these portions 38 and 39 there are seven turns of tubular element as against the six turns located elsewhere. This extra turn provides compensation for the decrease in current intensity due to the portions 38 and 39 of the slot.

In the claims, the term "split ring" is intended to define a ring that has a split or interruption extending continuously from one end face to the other.

I claim:

1. A high-frequency heater for the external surface of an article, comprising a current-conducting ring having a split and being adapted to surround the article at the surface to be heated and a hollow coolant-carrying current-conducting element having an intermediate portion extending from one side of the split around the ring to the other side of the split and bonded to the exterior of the ring, a first terminal portion extending from the end of the intermediate portion at the said one side of the split across the split into overlapping relation with the end of the intermediate portion of the element at the other side of the split but out of contact with the ring and the end of the intermediate portion of the element at the said other side of the split, and a second terminal portion extending from the end of the intermediate portion of the element at the said other end of the split across the split into overlapping relation with the end of the intermediate portion at the said one side of the split but out of contact with the ring and the end of the intermediate portion at the said one side of the split.

2. A high frequency heater for the external surface of an article, comprising a current-conducting ring having a diagonal split and being adapted to surround the article at the surface to be heated and a hollow coolant-carrying current-conducting element having an intermediate portion extending from one side of the split around the ring to the other side of the split and bonded to the exterior of the ring, one end of the intermediate portion being in overlapping relation with respect to the other end thereof by virtue of the diagonal split in the ring, the element further having a first terminal portion extending from the end of the intermediate portion at the said one side of the split across the split into overlapping relation with the end of the intermediate portion of the element at the other side of the split but out of contact with the ring and the end of the intermediate portion of the element at the said other side of the split, and a second terminal portion extending from the end of the intermediate portion of the element at the said other end of the split across the split into overlapping relation with the end of the intermediate portion at the said one side of the split but out of contact with the ring and the end of the intermediate portion at the said one side of the split.

3. A high-frequency heater for a peripheral surface of an article, comprising a current-conducting ring having a split and external and internal peripheral surfaces and being adapted for positioning with respect to the article as to cause the peripheral surface of the article and a peripheral surface of the ring to have a surrounding relation with respect to one another and a hollow coolant-carrying current-conducting element having an intermediate portion extending from one side of the split about the other peripheral surface of the ring to the other side of the split and bonded to the ring, a first terminal portion extending from the end of the intermediate portion at the said one side of the split across the split into overlapping relation with the end of the intermediate portion of the element at the other side of the split but out of contact with the ring and the end of the intermediate portion of the element at the said other side of the split, and a second terminal portion extending from the end of the intermediate portion of the element at the said other end of the split across the split into overlapping relation with the end of the intermediate portion at the said one side of the split but out of contact with the ring and the end of the intermediate portion at the said one side of the split.

4. A high-frequency heater for a peripheral surface of an article, comprising a current-conducting ring having a diagonal split and being adapted for positioning with respect to the article as to cause the peripheral surface of the article and a peripheral surface of the ring to have a surrounding relation with respect to one another and a hollow coolant-carrying current-conducting element having an intermediate portion extending from one side of the split about the other peripheral surface of the ring to the other side of the split and bonded to the ring, one end of the intermediate portion being in overlapping relation with respect to the other end thereof by virtue of the diagonal split in the ring the element further having a first terminal portion extending from the end of the intermediate portion at the said one side of the split across the split into overlapping relation with the end of the intermediate portion of the element at the other side of the split but out of contact with the ring and the end of the intermediate portion of the element at the said other side of the split, and a second terminal portion extending from the end of the intermediate portion of the element at the said other end of the split across the split into overlapping relation with the end of the intermediate portion at the said one side of the split but out of contact with the ring and the end of the intermediate portion at the said one side of the split.

5. A high frequency heater for the external surface of an article, comprising a current-conducting ring having a stepped split and being adapted to surround the article at the surface to be heated and a hollow coolant-carrying current-conducting element having an intermediate portion extending from one side of the split around the ring to the other side of the split and bonded to the exterior of the ring, one end of the intermediate portion being in overlapping relation with respect to the other end thereof by virtue of the stepped split in the ring, the element further having a first terminal portion extending from the end of the intermediate portion at the said one side of the split across the split into overlapping relation with the end of the intermediate portion of the element at the other side of the split but out of contact with the ring and the end of the intermediate portion of the element at the said other side of the split, and a second terminal portion extending from the end of the intermediate portion of the element at the said other end of the split across the split into overlapping relation with the end of the intermediate portion at the said one side of the split but out of contact with the ring and the end of the intermediate portion at the said one side of the split.

6. A high frequency heater for the external surface of an article, comprising a current-conducting ring having a V-split and being adapted to surround the article at the surface to be heated and a hollow coolant-carrying current-conducting element having an intermediate portion extending from one side of the split around the ring to the other side of the split and bonded to the exterior of the ring, one end of the intermediate portion being bonded to the male end of the V-split in the ring and extending across the split over the female end without contacting the same, the other end of the intermediate portion being formed in branches bonded to the female end of the V-split in the ring on opposite sides of the said one end of the intermediate portion without contacting the same and extending across the split over the male end of the ring without contacting the same.

7. A high-frequency heater for a peripheral surface of an article, comprising a current-conducting ring having a stepped split and being adapted for positioning with respect to the article as to cause the peripheral surface of the article and a peripheral surface of the ring to have a surrounding relation with respect to one another and a hollow coolant-carrying current-conducting element having an intermediate portion extending from one side of the split about the other peripheral surface of the ring to the other side of the diagonal split in the ring the element further having a first terminal portion extending from the end of the intermediate portion at the said one side of the split across the split into overlapping relation with the end of the intermediate portion of the element at the other side of the split but out of contact with the ring and the end of the intermediate portion of the element at the said other side of the split, and a second terminal portion extending from the end of the split across the split into overlapping relation with the end of the intermediate portion at the said one side of the split out of contact with the ring and the end of the intermediate portion at the said one side of the split.

8. A high-frequency heater for a peripheral surface of an article, comprising a current-conducting ring having a V-shaped split and being adapted for positioning with respect to the article as to cause the peripheral surface of the article and a peripheral surface of the ring to have a surrounding relation with respect to one another and a hollow coolant-carrying current-conducting element having an intermediate portion extending from one side of the split about the other peripheral surface of the ring to the other side of the split and bonded to the ring, one end of the intermediate portion being bonded to the male end of the V-split in the ring and extending across the split over the female end without contacting the same, the other end of the intermediate portion being formed in branches bonded to the female end of the V-split in the ring on opposite sides of the said one end of the intermediate portion without contacting the same and extending across the split over the male end of the ring without contacting the same.

OMER E. BOWLUS.

REFERENCES CITED

The following references are of record in the file of this patent:

UNITED STATES PATENTS

| Number | Name | Date |
| --- | --- | --- |
| 1,789,229 | Gebhard | Jan. 13, 1931 |
| 1,936,309 | Northrup | Nov. 21, 1933 |
| 2,151,035 | Kennedy | Mar. 21, 1939 |
| 2,271,916 | Denneen et al. | Feb. 3, 1942 |
| 2,397,990 | Sherman | Apr. 9, 1946 |
| 2,408,229 | Roberds | Sept. 24, 1946 |

OTHER REFERENCES

General Electric Electronic Heaters Catalogue (GEA-4076), particularly page 3, November 1943.